United States Patent
Ben-Natan

(10) Patent No.: US 7,506,371 B1
(45) Date of Patent: Mar. 17, 2009

(54) SYSTEM AND METHODS FOR ADAPTIVE BEHAVIOR BASED ACCESS CONTROL

(75) Inventor: Ron Ben-Natan, Lexington, MA (US)

(73) Assignee: Guardium, Inc., Waltham, MA (US)

(*) Notice: Subject to any disclaimer, the term of this patent is extended or adjusted under 35 U.S.C. 154(b) by 1065 days.

(21) Appl. No.: 10/762,660

(22) Filed: Jan. 22, 2004

(51) Int. Cl.
G06F 21/00 (2006.01)

(52) U.S. Cl. ...................................... 726/18

(58) Field of Classification Search ................ 726/180, 726/18
See application file for complete search history.

(56) References Cited

U.S. PATENT DOCUMENTS

| | | | | |
|---|---|---|---|---|
| 5,299,257 | A | 3/1994 | Fuller et al. | 379/100.05 |
| 5,737,316 | A | 4/1998 | Lee | 370/248 |
| 5,825,772 | A | 10/1998 | Dobbins et al. | 370/396 |
| 6,122,403 | A | 9/2000 | Rhoads | 382/233 |
| 6,311,272 | B1 | 10/2001 | Gressel | 713/186 |
| 6,480,861 | B1 | 11/2002 | Kanevsky et al. | 707/103 Y |
| 6,532,465 | B2 | 3/2003 | Hartley et al. | 707/10 |
| 6,633,936 | B1 | 10/2003 | Keller et al. | 710/107 |
| 6,658,091 | B1 | 12/2003 | Naidoo et al. | 379/37 |
| 6,658,625 | B1* | 12/2003 | Allen | 715/236 |
| 6,681,331 | B1* | 1/2004 | Munson et al. | 726/23 |
| 6,714,778 | B2 | 3/2004 | Nykanen et al. | 455/414.1 |
| 6,842,105 | B1 | 1/2005 | Henderson et al. | 340/5.73 |
| 6,851,004 | B2 | 2/2005 | Keller et al. | 710/107 |
| 6,941,472 | B2* | 9/2005 | Moriconi et al. | 726/11 |
| 7,171,413 | B2* | 1/2007 | Puz et al. | 707/9 |

OTHER PUBLICATIONS

Lunt et al, "IDES: A Progress Report," IEEE, 1990.*

* cited by examiner

*Primary Examiner*—Andrew L Nalven
(74) *Attorney, Agent, or Firm*—Chapin IP Law, LLC; Barry W. Chapin, Esq.

(57) ABSTRACT

Typical conventional content based database security scheme mechanisms employ a predefined criteria for identifying access attempts to sensitive or prohibited data. An operator, identifies the criteria indicative of prohibited data, and the conventional content based approach scans or "sniffs" the transmissions for data items matching the predefined criteria. In many environments, however, database usage tends to follow repeated patterns of legitimate usage. Such usage patterns, if tracked, are deterministic of normal, allowable data access attempts. Similarly, deviant data access attempts may be suspect. Recording and tracking patterns of database usage allows learning of an expected baseline of normal DB activity, or application behavior. Identifying baseline divergent access attempts as deviant, unallowed behavior, allows automatic learning and implementation of behavior based access control. In this manner, data access attempts not matching previous behavior patterns are disallowed.

41 Claims, 10 Drawing Sheets

SYSTEM AND METHODS FOR ADAPTIVE BEHAVIOR BASED ACCESS CONTROL

BACKGROUND OF THE INVENTION

Conventional data security applications employ access based or content based approaches. Access based approaches, such as password systems, firewalls, and physical network segregation, prevent access via electronic or physical means. Content based approaches, in contrast, focus on the content of the data and preventing sensitive content from dissemination, while not necessarily affecting the underlying connection or communication mechanism. Content based approaches include, for example, encryption, which renders data in an unintelligible form to unintended recipients, and filters, which selectively modify or overwrite packets, such as web browser "parental controls" which scan for certain keywords in the web page data portions.

Content based approaches are more granular than their access based counterparts, since the content based approach allows selective restriction of certain transmissions, rather than absolutely denying all access. However, content based approaches compute, or determine, permissible transmission according to a predefined criteria. Such computations may incorporate a degree of error, either permitting undesirable transmissions, or inadvertently blocking acceptable transmissions. Further, since content based approaches examine the transmission stream in real time, throughput performance may be affected. Also, effectiveness of a content based solution typically depends on a user or operator effectively defining or enumerating the predefined criteria for determining the appropriateness of a particular transmission.

Such a conventional data security mechanism is often employed to control access to a protected resource, such as a database (DB). Typical conventional database applications operate on a relational database employing a query language such as the Structured Query Language (SQL), as is known to those of skill in the art. SQL is operable with relational databases particularly because it lends itself well to the table and row arrangement of the objects in the relational database. An SQL query is an English-like statement specifying particular tables and attributes in rows having certain values. Conditional statements, including Boolean comparisons of equality and range, identify certain rows, or records, in the queried tables, or objects. Further, a user specifies interrelations between the tables by specifying joins, as are known to those of skill in the art, which identify logical relations between rows, or records, of different tables based on the values in the records. The database returns data entries matching the access attempt in the form of a set of rows of data satisfying the query.

SUMMARY

Conventional content based approaches to database security employ the predefined criteria for identifying access attempts to sensitive or prohibited data. A user, or security operator, identifies the criteria indicative of prohibited or sensitive data, and the conventional content based approach (which is usually part of the database security infrastructure), matches all requested data items (or requests for data items) with the predefined criteria to determine if the request should be honored. Therefore, the operator or user defining the predefined set must be sufficiently familiar with the type of data, the type of access patterns and the type of users and applications accessing the systems to be restricted in order to define an effective set of criteria. Further, the matching and analysis operations required for examination may impact performance. Selection of a predefined criteria which mitigates the performance impact is beneficial. Also, imprecise specification of the predefined set of criteria may cause false positives or false negatives in the security assessment of the scanned data. Finally, because different database products employ different models, an operator working within a heterogeneous environment needs to possess skills that span a variety of system. Implementing a particular security policy criteria across several operating environments, or platforms, may complicate configuration and maintenance issues.

Enumeration of the criteria for identifying harmful, malicious, or other prohibited access attempts is cumbersome in conventional security approaches. Identification of the conventional criteria is a protracted approach which may be prone to omissions due to operator oversight. Further, the security operator must anticipate exceptions and nuances to a broadly specified criteria, lest the access criteria thwart an authorized access attempt. For example, in many organizations personal information such as home address and salary information are deemed sensitive data. Normal business workflow does not typically require regular access to such information. However, many access attempts to the salary and address are expected during an end of month payroll run, for example. Therefore, a competent security operator need ensure adequate access to such data during the payroll period by authorized human resource users. However, more restrictive access criteria is appropriate at other times. Further, maintenance of the conventional access criteria to avoid staleness and adapt to changes, such as when a company changes from monthly to bi-weekly payroll, for example, is required.

Therefore, conventional content based security approaches are cumbersome to implement, risk false positives and negatives, and burden throughput with the need to check and analyze each access attempt. It would be beneficial to provide a deterministic content based approach which adapts to changes in the database usage by inferential feedback and which has a manageable granularity of access criteria to allow intuitive oversight and correction to the access criteria. It would be further beneficial to provide such access control without overburdening throughput and minimizing manual development of the access criteria to avoid a cumbersome enumeration of conceivable access attempts.

In many data storage and retrieval environments, database usage tends to follow repeated patterns of legitimate usage. Such usage patterns, if tracked, are deterministic of normal, allowable data access attempts. Similarly, deviant data access attempts may be suspect. Recording and tracking patterns of database usage allows learning of an expected baseline of normal DB activity, or application behavior. Identifying baseline divergent access attempts as deviant, unallowed behavior, allows automatic learning and implementation of behavior based access control. A learning mode which tracks normal database usage accumulates information pertinent to normal behavior for defining such a baseline. Following the baseline capture during the learn mode, successive access attempts are matched against the learned baseline to determine and allow legitimate, allowable access and disallow deviant, prohibited access.

Typical software applications, therefore, tend to exhibit deterministic behavior when accessing a protected resource such as a database. Such deterministic behavior is typically exhibited as a set of tables accessed together, a sequence of fetches or updates, or a series of complementary operations, such as fields which are accessed or modified together. Further, such deterministic behavior typically exhibits characteristics with respect to the source and time of the access attempts. For example, certain updates may emanate from a particular username or network address. Similarly, as in the payroll example above, such operations may occur during a particular time interval. Once the security filter learns the deterministic behavior indicative of allowable access attempts, successive access attempts may be scrutinized according to the acceptable deterministic behavior.

In a conventional data storage and retrieval environment, a conventional user application issues data access attempts to access the DB for various data storage and retrieval operations via a software database application. In such a software database application, SQL statements employed in database transactions follow syntactical rules. Accordingly, the data access attempts exhibit particular structures when accessing the database. Normal, allowable access attempts tend to follow patterns of DB object manipulations. Such software application access attempts therefore exhibit deterministic patterns, which security filter of the present invention employs to determine the propriety of the future, successive access attempts. Access patterns matching previous allowable behavior patterns are deemed benign and allowable, while deviant behavior patterns indicate access attempts which should be prohibited.

Configurations of the invention substantially overcome the above-described shortcomings of conventional content based security mechanisms by observing application behavior performed in accessing the database, and adaptively recognizing successive allowable patterns of such data access attempts. A security filter observes database activity to ascertain allowable access attempts. A repository records a set of allowable access attempts as a baseline for future comparisons. The security filter adaptively maintains the set of allowable access attempts by selectively adding allowable access attempts to the baseline based on rule logic and inferentially modifying the baseline via a feedback loop. Modifications to the baseline access criteria include an intuitive check involving security operator oversight to avoid adding rogue accesses from allowable classification. In this manner, the security filter observes and records deterministic behavior exhibited by current access attempts as a baseline and compares future access attempts to the deterministic behavior indicative of allowable access attempts.

The security filter, therefore, stores such database access attempts as the baseline set of allowable access attempts. A baseline repository stores the baseline set of allowable access attempts for comparison with future access attempts. As indicated above, database access attempts in the form of an SQL query employ a particular syntax. This syntax allows a parse tree representation of the query to be formed. The parse tree is expressible as a tree or similar data structure, and defines a certain structure corresponding to the query. The structure of a particular query tends to differ from other queries such that it identifies the deterministic behavior of a particular application. Further, a hashing operation may traverse the structure exhibited by the parse tree to compute a hash value indicative of the structure. Such a hash value is unlikely to be duplicated by a hash corresponding to a dissimilar access attempt. Accordingly, the security filter employs such a hash value for comparison with successive access attempts to determine a correspondence to the set of allowable access attempts, as will be discussed further below. If a matching hash is found in the baseline set, the access attempt is allowable, and if no matching hash is found, the access attempt is deemed to be indicative of deviant behavior.

In further detail, the method for behavior based access control and tracking of an application as disclosed herein includes intercepting an access attempt to a protected resource, and comparing the access attempt to a preexisting set of allowable access attempts to determine if the access attempt corresponds to a previous allowable access attempt. Depending on whether a positive match is found, thus indicating allowable behavior, an enforcer selectively permits, based on the comparing, access to the protected resource according to the access attempt. If the access attempt is permitted, an inference engine then adds the access attempt to the set of allowable access attempts.

Comparing the access attempt to preexisting access attempts includes determining a structure of the access attempt corresponding to syntactical arrangement of the access attempt, and comparing the determined structure of the access attempt independently of the data values implicated in the access attempt. Such comparisons include parsing the access attempt, and building a parse tree parse tree indicative of a syntactical structure of the data access attempt. Comparing then further includes computing a hash value from the determined structure embodied in the parse tree, and comparing the hash value to the hash values of previous access attempts. Therefore, the structural approach of the baseline stores the structure of the access attempts, and avoids including data values of the data access transactions from which it is derived. Such an approach also abstracts the security details from the implementation to facilitate enforcement of the baseline across multiple platforms, since the parse tree and hash representations of the data access attempts are platform independent.

An access policy having a plurality of access rules operates in conjunction with the baseline of allowable access attempts, in which the access rules are indicative of allowable access, and wherein the preexisting baseline set corresponds to one of the rules of the access policy. Selectively permitting further includes, based on iteratively applying the access rules to the access attempt, an access result indicative of whether to allow the access attempt. Such an access policy is discussed in further detail in copending U.S. patent application Ser. No. 10/723,521, filed Nov. 26, 2003, entitled "SYSTEM AND METHODS FOR NONINTRUSIVE DATABASE SECURITY", incorporated herein by reference in entirety.

An inference engine performs augmentation of the access policy by identifying a plurality of allowable access attempts, and inferring, based on observable patterns in the allowable access attempts, access rules indicative of the plurality of allowable access attempts. The inference engine then adds the inferred rules to the access policy. A learner in the inference engine processes the series of allowable access attempts to determine related groups of allowable access transactions, and suggesting, based on a commonality of the processed group of allowable access attempts, an access rule indicative of each of the series of allowable access attempts. A rule suggestor presents suggested rules for intuitive consideration by a security operator, and adds suggested access rules to the access policy in response to operator input.

Particular configurations, therefore, employ the inference engine in to provide inferential feedback to augment the allowed behavior patterns in the baseline. The security filter captures a time segment, or window, of allowable access attempts. The captured window of access attempts then augments or supplements the current baseline to add or refine the allowable behavior patterns. Further, the security filter employs rule logic including a learner which develops suggested rules corresponding to a plurality of allowable access attempts. For example, a series of access attempts may indicate a plurality of access attempts from the same subnet, e.g. the security filter receives access attempts from IP addresses:

192.168.1.10, 192.168.1.15,
192.168.1.172 and
192.168.1.185.

The rule logic determines a suggested rule of allowing access attempts from subnet 192.168.1, since the allowable behavior exhibited by the exemplary access attempts emanate from this subnet address. This suggested rule is confirmable by the security operator via a rule suggestor, who intuitively assesses the proposed rule and concludes that in an environment supported by the Dynamic Host Configuration Protocol (DHCP), such addresses are typical of the assignments made by DHCP in the normal course of address assignment. Accordingly, such a suggested rule seems indicative of allowable behavior, i.e. it intuitively "makes sense."

The suggested rules are operable with the access policy, such as that disclosed in the copending application cited above. Such an access policy identifies access rules applicable to SQL statements or other query operations. Typically, such rules are broader assertions that expressible by a single allowable access attempt, and can therefore effectively replace many allowable baseline access attempt entries. In the above example, the plurality of allowable baseline entries for subnet 192.168.1 are satisfied by the suggested rule to allow subnet access from 192.168.1.

Therefore, the rule suggestor for allowing intuitive inferential feedback operates in conjunction with a rule based access policy. Rules in the access policy define broad definitions of allowable access. The security filter defines the current baseline as a rule in the access policy, typically as the last entry in an access policy table enumerating such rules. The current baseline defines the allowable behavior patterns which permit access as a rule entry in the less granular rule policy. Therefore, a typical purported access is first matched against the policy table, and if not falling into another rule, triggers the rule corresponding to the current baseline and is compared to the current baseline to determine if the access attempt matches previous allowable behavior. As the current baseline grows to yield additional suggested rules, the access policy incorporates the rules indicative of allowable behavior based on the current baseline.

Therefore, inferential feedback is provided in two ways. The current baseline may be augmented by capturing additional windows of allowable access attempts, and adding the access attempts from the window to the current baseline. Also, the rule logic generates suggested rules based on the current baseline, which the security operator intuitively analyzes to ascertain which of the suggested rules is indicative of allowable behavior. The security operator then selectively adds the acceptable suggested rules to the access policy via the rule suggestor.

In particular configurations, the parser employs a hash engine to create a hash value from the parse tree. After the parser generates the parse tree representation of the SQL access statement, the hash engine computes a hash of the structure. The hash is a numeric representation computed from the structure of the parse tree, and is unlikely to be duplicated by other SQL statements. Therefore, comparison of the hash value tends to be deterministic of similar SQL statements in successive access attempts, and is therefore a reliable indicator of permissive behavior when compared to the hash of previous allowable attempts.

The hash, in addition to being relatively fast to compute and compare, also has the advantage of being based on the structure of the data sought, rather than the data itself. Since the hash does not contain any actual data, but rather stores only structural information, storage of the structural hash does not present security issues for the data it corresponds to. If allowable behavior is defined in terms of actual data, then the storage of that behavior information becomes as sensitive of the data itself. In other words, if behavior data indicative of, for example, user's social security numbers stores the actual social security number, then that behavior data need be afforded similar safeguards as the actual underlying data set. By storing only the structural information, the storage of the behavior data needs no special protection inherited from the data it corresponds to. Such a storage approach is also beneficial for demonstrating, for example, regulatory compliance with guidelines that mandate tracking certain types of exchanges, without burdening such regulatory reporting with the actual sensitive data.

The invention as disclosed above is described as implemented on a computer having a processor, memory, and interface operable for performing the steps and methods for providing nonintrusive database security as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention are based, in part, on the observation that typical conventional software applications tend to exhibit deterministic and highly-repetitive behavior when accessing a protected resource such as a database. Such deterministic and repeating behavior is typically exhibited as a set of tables accessed together, a sequence of fetches or updates, or a series of complementary operations, such as fields which are accessed or modified together. Further, such deterministic behavior typically exhibits characteristics with respect to the source and time of the access attempts. For example, certain updates may emanate from a particular username or network address. Similarly, as in the payroll example above, such operations may occur during a particular time interval. Once the security filter learns the deterministic behavior indicative of allowable access attempts, successive access attempts may be scrutinized according to the acceptable deterministic behavior.

Particular configurations of the invention observe application behavior performed by applications accessing the database, and adaptively recognizing successive allowable patterns of such data access attempts. A security filter observes database activity to ascertain allowable access attempts. A repository records a set of allowable access attempts as a baseline for future comparisons. The security filter adaptively maintains the set of allowable access attempts by selectively adding allowable access attempts to the baseline based on rule logic and inferentially modifying the baseline via a feedback loop. Modifications to the baseline access criteria include an intuitive check involving security operator oversight to avoid adding rogue accesses from allowable classification. In this manner, the security filter observes and records deterministic behavior of current access attempts as a baseline and compares this baseline access criteria including the set of allowable access attempts with future access attempts.

Figure 1:
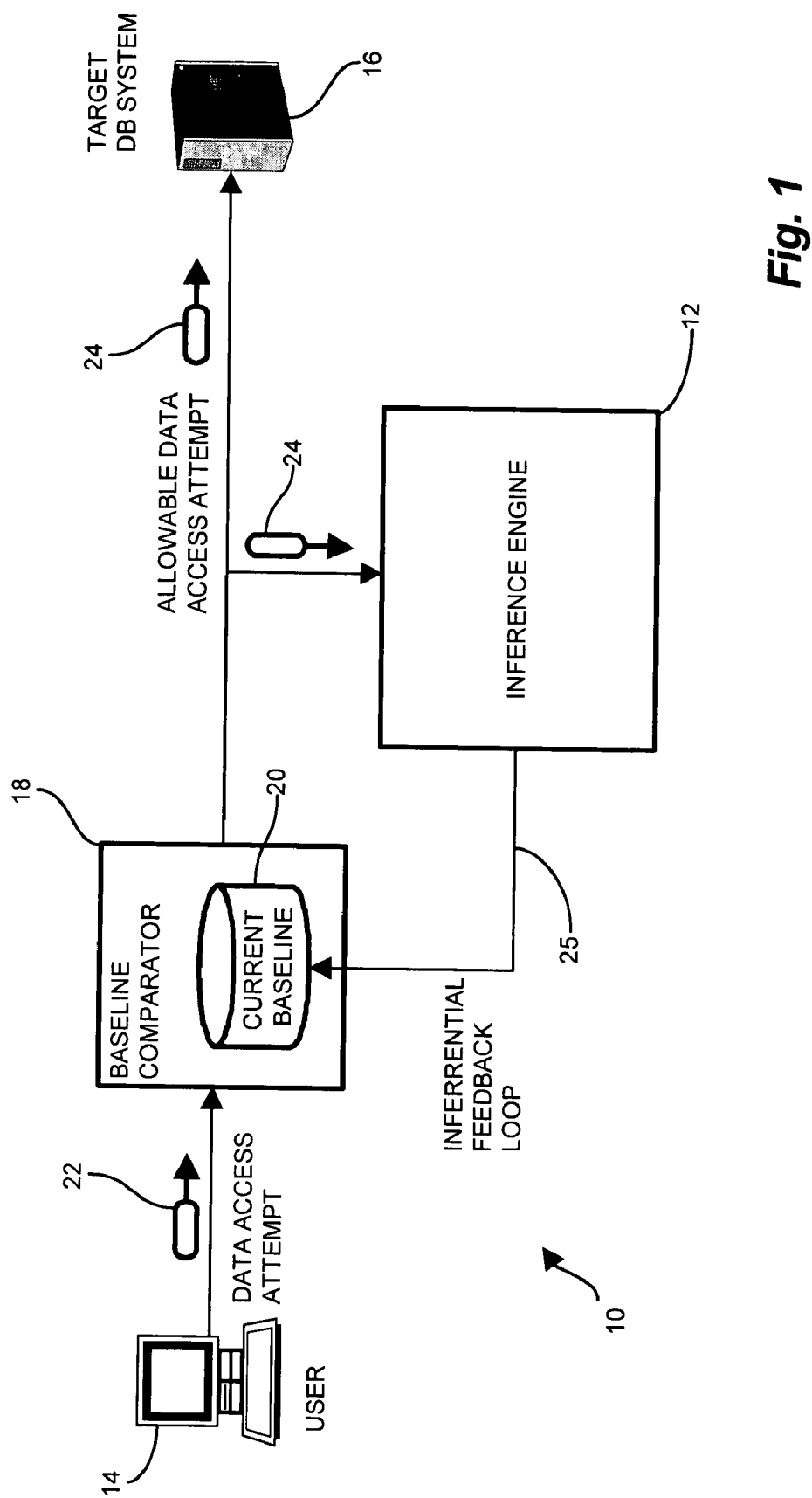
FIG. 1 is a block diagram of a data storage and retrieval environment suitable for use with the present invention.

FIG. 1 is a block diagram of a data storage and retrieval environment suitable for use with the present invention. Referring to FIG. 1, the data storage and retrieval environment 10 includes an inference engine 12 in communication with a baseline comparator 18 disposed between a user 14 and a protected resource such as a target database system 16. The baseline comparator 18 includes a current baseline 20 operable for comparison with a data access attempt 22 from a user 14. The comparator 18 determines, based on the current baseline 20, whether to permit the data access attempt 22 as an allowable access attempt 24 to the target DB system 16. The inference engine 24 also receives the allowable access attempt 24 for augmenting the current baseline 20 via an inferential feedback loop 25.

The baseline 20 is usually employed by a security filter, described further below, as part of an overall security policy. Comparison to the current baseline is an aspect of the security policy which looks to previous allowable behavior as a deterministic metric for analyzing current traffic. Therefore, the current baseline 20 usage actually entails a twofold process incorporating the inferential feedback loop 25. The current baseline 20 is representative of one or more windows of routine, allowable data access attempts. Additional windows of access attempts augment the baseline after a configurable period of inspection. The inferential feedback loop represents a multi-stage operation, since immediate additions of allowable access attempts are redundant with the baseline entries that admitted them. Therefore, the inferential feedback loop is not intended to be implemented as a realtime closed loop, since to admit allowable data access attempts individually is redundant, as each attempt is already represented as allowable behavior, as indicated by their allowance. Augmentation to the baseline occurs via first gathering a window of data access attempts 22, and adding the inferential feedback either as baseline 20 additions resulting from gathering the window, or by rules inferred from previously gathered data access attempts 22, of which the current baseline may already be partially indicative of. Such feedback and augmentation is discussed in further detail below.

Figure 2:
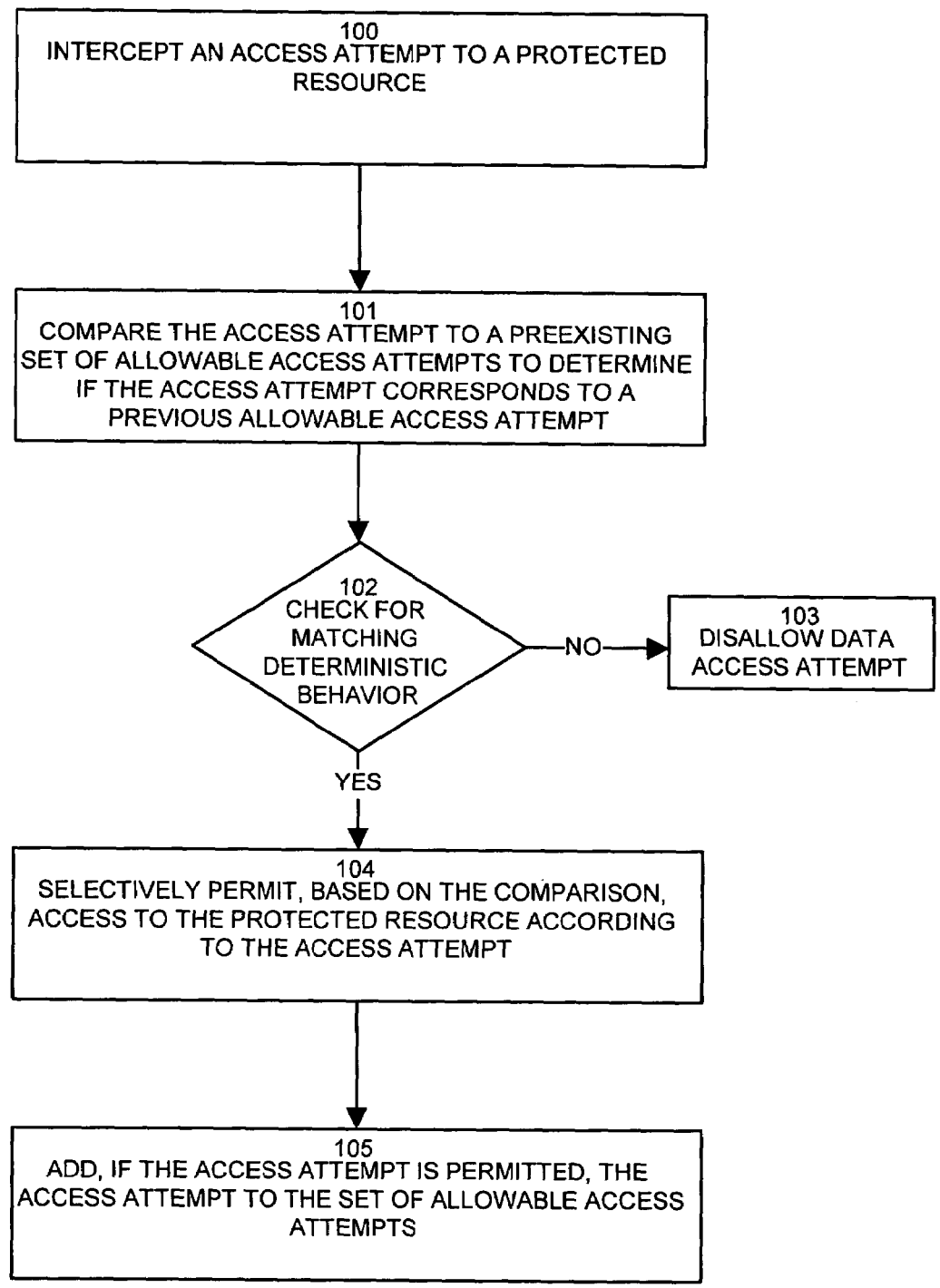
FIG. 2 is a flowchart of data storage and retrieval in the system in FIG. 1.

FIG. 2 is a top level flowchart of exemplary data storage and retrieval in the system in FIG. 1. Referring to FIGS. 1 and 2, the method for behavior based access tracking of an application includes intercepting an access attempt to a protected resource, as depicted at step 100. Such accesses include the data access attempt 22 to the target database system 16 in FIG. 1. The security filter 26 compares the access attempt to a preexisting set of allowable access attempts to determine if the access attempt corresponds to a previous allowable access attempt, as depicted at step 101. In the illustrated exemplary configuration, the preexisting set of allowable data access attempts 22 is the current baseline 20.

The current baseline 20 is deemed to be representative of allowable data access transactions, and therefore models acceptable behavior of transactions to the database. By way of further example, a behavior exemplified by a particular software application may be to access three tables A, B, and C together. Table A may therefore be an employee set, table B a list of home addresses, and table C stores salary information. A payroll application likely accesses all three. Similarly, there is little reason to access salary alone outside a payroll run, so a data access attempt at table C alone indicates disallowed behavior. The behavior pattern thus illustrated is that the same 3 tables are accessed together by a particular data access statement. Therefore, the current baseline includes an entry that data access transactions referencing tables A, B, and C are allowable as deterministic of good behavior. Accordingly, an attempt to access only one or two of the tables, such as C and A (employed and salary), but not B may be disallowed as bad behavior.

A check is performed to assess the outcome of the current baseline 20 comparison, as shown at step 102. If the compared data access transaction matched a pervious allowable access attempt, thus indicating acceptable behavior, the baseline comparator 18 selectively permits, based on the comparing, access to the target DB 16 according to the access attempt 22. Otherwise, the baseline comparator 18 denies access, as disclosed at step 103.

If the data access transaction 22 is permissible, then the baseline repository 42 stores the access attempt 22 in the set of allowable access attempts, as depicted at step 104. The instant data access transaction may also be included in the current baseline 20, however, as will be described further below, the current baseline 20 is a subset of allowable data access transactions 24 captured over one or more time interval windows of such attempts.

Therefore, as the current baseline 20 indicates good behavior, times at which the current baseline 20 is gathered is significant. By way of further example, in the payroll example above, it is likely that the payroll runs only periodically, such as biweekly or monthly. Accordingly, gathering a current baseline 20 during a payroll run may not be indicative of normal allowable behavior, since the payroll run will tend to heavily access the salary table C. Capturing data access transactions 22 during such a payroll run may store payroll table accesses into the current baseline of allowable behavior, therefore endorsing an otherwise atypical salary table access as good behavior. For this reason, selection of the current baseline 20, which is deemed to be indicative of allowable behavior, is scrutinized and maintained to avoid anomalies that may corrupt, or inject negative reinforcement to, the allowable behavior enforced by the current baseline 20, as will be discussed further below.

Figure 3:
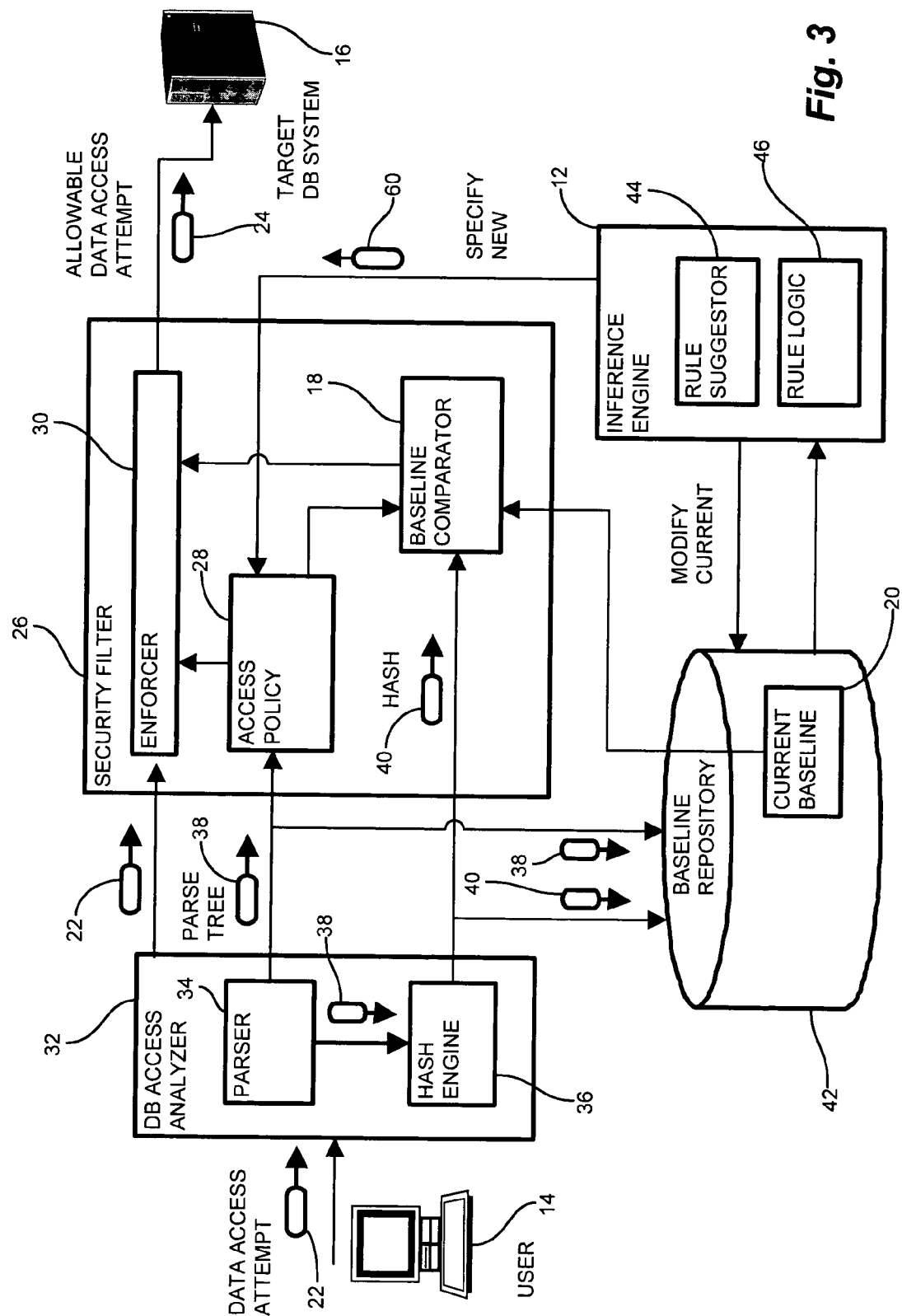
FIG. 3 is a block diagram of a particular configuration of a system suitable for use with the present invention.

FIG. 3 is a block diagram of a particular configuration of a system suitable for use with the present invention and including the interconnected elements of FIG. 1 in greater detail. Referring to FIG. 3, a security filter 26 includes the baseline comparator 18, and also includes an access policy 28 and an enforcer 30. The enforcer 30 determines, responsively to the baseline comparator 18 and the access policy 28, whether to permit transmission of the data access attempt 22 to the target DB system 16 as an allowable data access attempt 24.

The security filter 26 is in communication with a database access analyzer 32 that includes a parser 34 and a hash engine 36. In the particular exemplary configuration, the data access attempt 22 is an SQL statement, and the parser 34 generates a parse tree 38 representation of the data access attempt 22 indicative of the structure thereof. The hash engine 36 receives the parse tree 38 and computes a hash value 40, also corresponding to the structure of the data access attempt. The security filter 26 employs the hash value 40 for comparison with the current baseline 20 via the baseline comparator 18, discussed further below, and the parse tree 38 for comparison with the access policy 28.

A baseline repository 42 receives the hash 40 for storage with other hash values indicative of other data access attempts 22. The baseline repository 42 also stores the current baseline 20, which is a set of hash values 40 corresponding to data access attempts 22 indicative of allowable behavior based on previous attempts 22. The current baseline, therefore, represents a set of access attempts from one or more time windows of access of allowable data access attempts. Note that the baseline repository is not limited to storing only hash representations, but may also store the actual SQL statement and corresponding parse tree 38.

The inference engine 12 includes a rule suggestor 44 and rule logic 46 for augmenting the acceptable behavior of database activity. Specifically, the inference engine 12 allows modification of the access attempts 22 reflected in the current baseline 20, and allows insertion of suggested rules into the access policy 28 based on the access attempts 22 from the baseline repository 42. The rule logic 46 contains instructions for determining access attempts 22 indicative of good behavior and for generating suggested rules from a plurality of the good behavior access attempts, described further below. For example, the rule logic 46 includes a threshold indicative of a number of times a particular data access attempt 22 is to appear before being included in the current baseline 20 as indicative of "good" behavior. This prevents a rogue "bad" attempt from being "blessed", or accepted as an allowable access attempt 24. The rule suggestor 44 includes a user interface, discussed further below, for manipulating windows of access transactions (sets of data access attempts 22) for entry into the current baseline 20 of acceptable behavior. The rule suggestor 44 also allows the suggested rules entry into the access policy 28 in response to endorsement or approval by the security operator.

Therefore, the rule suggestor 44 infers rules which appear to be indicated by a series of access attempts 22 observed during a window of normal, allowable behavior. Such rules, being derived from a period of allowable behavior, tend to be accurate predictors of future data access attempts 22. The concept of suggesting the inferred rules from the baseline of allowable behavior, and receiving operator input confirming such a predictor, represents normal system behavior in the baseline without requiring a security operator to explicitly anticipate and define each allowable data access attempt. It also provides a safety valve via the confirmation step to ensure that rogue operations which happen to coincide with the capture window(s) of purportedly allowable behavior do not skew the trusted baseline 20 by inserting an atypical data access attempt.

Further, as indicated above, the baseline 20 hash comparison abstracts the details encapsulated in the individual data access requests 22 which may be somewhat platform specific. Therefore, the baseline 20 comparison, by employing the hash, responds similarly in different platforms since the parse tree 38 and hash 40 representations of the data access attempts 22 are nonetheless similar. Accordingly, the current baseline 22 is deployable across multiple platforms without modification, therefore allowing a common access policy 28 across the multiple platforms without creating a specific access policy 28 and/or baseline representation for each.

Figure 4:
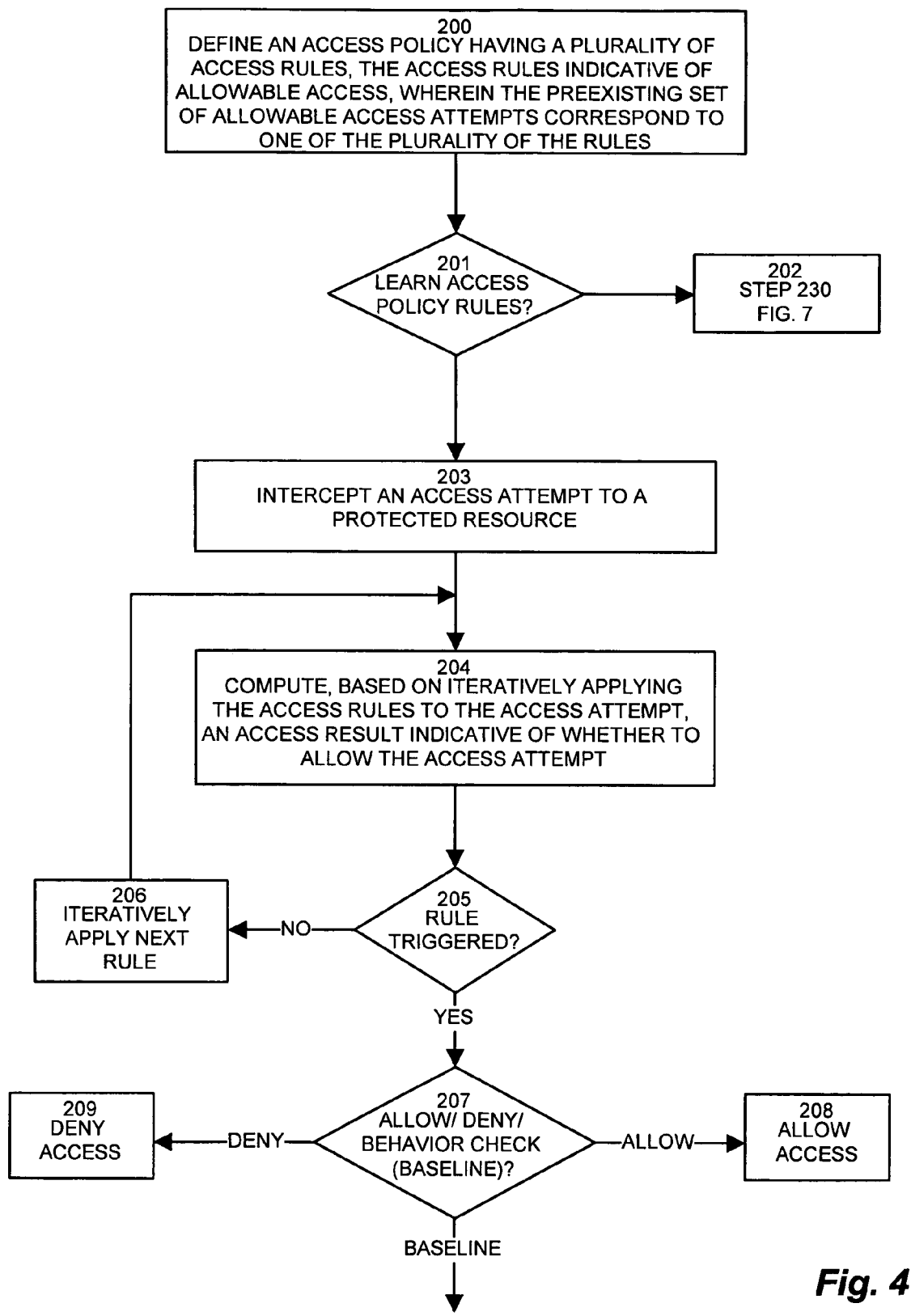
FIGS. 4-6 are a flowchart of the adaptive checking of deterministic behavior employing the configuration of FIG. 3.
Figure 5:
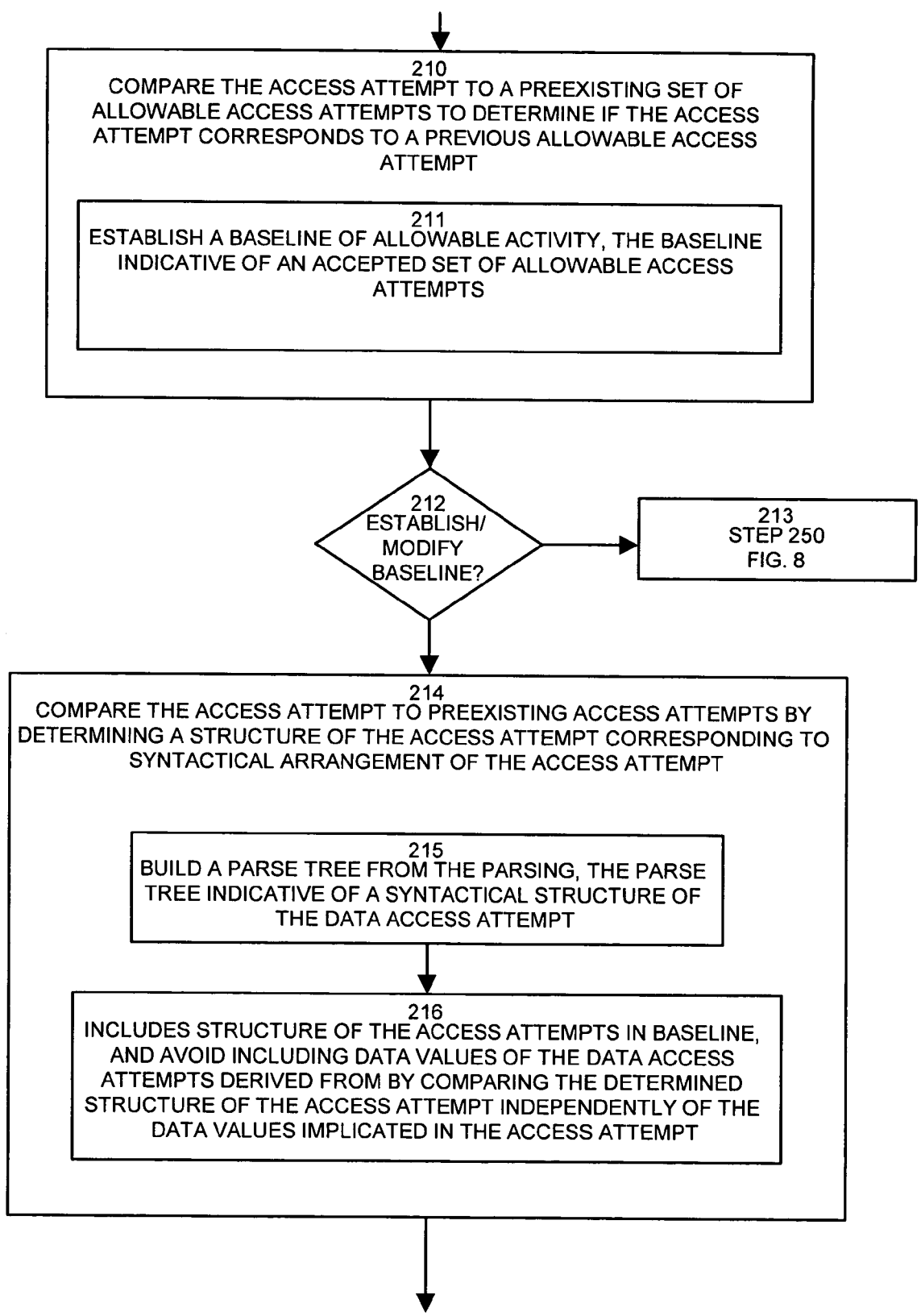
Figure 6:
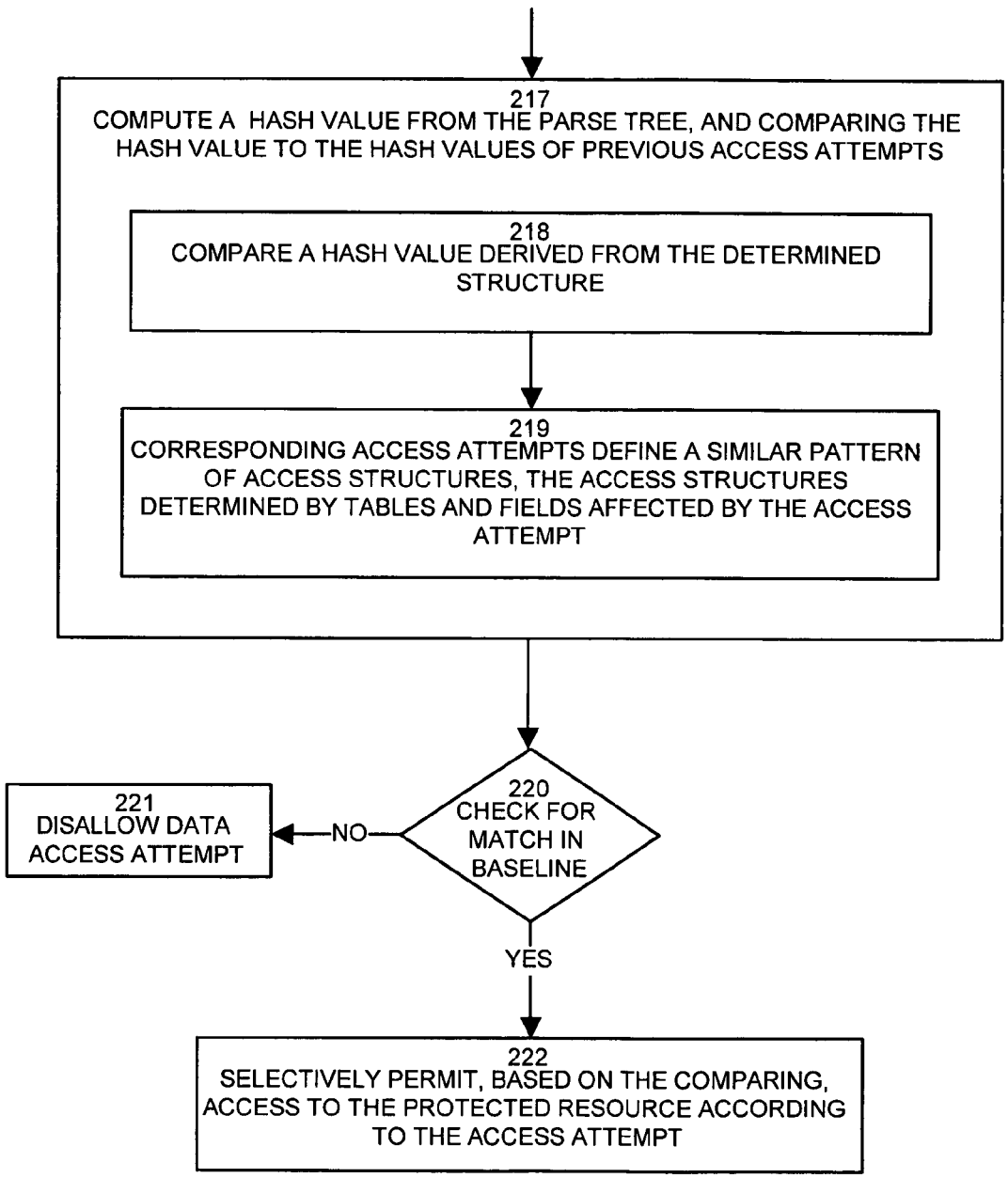

FIGS. 4-6 are a flowchart of the configuration of FIG. 3. Referring to FIGS. 4-6 and 3, the current baseline 20 described in FIG. 2 is often combined with a security policy. The security policy, as discussed further in the copending patent application cited above, complements the allowable behavior permitted by the current baseline by providing specific enumeration of allowable data access transactions. The security policy includes a set of rules, one of which is to look to the current baseline, which make specific determinations about allowable behavior. For example, in the payroll scenario described above, a current baseline which did not include a payroll run may be employed in an access policy 28 having a rule specifically allowing the payroll relevant data access attempts (i.e. Human resource users during the end of the month). In this manner, the current baseline 20 need not reference the relatively rare salary table access, yet payroll runs are not impeded because of a specific access policy 28 rule operable to allow appropriate access. Accordingly, the security filter 26 implements an access policy 28 having a plurality of access rules, in which the access rules are indicative of allowable access. The preexisting set of allowable access attempts contained in the current baseline 20 corresponds to one of the plurality of the rules, as depicted at step 200.

The defined access policy 28, in the particular exemplary configuration, involves explicit input from the security operator based on an inferential analysis of the access policy 28. The security operator affirmatively enters access rules into the access policy 28, whether suggested by the rule suggestor or based on the knowledge of the security operator. Similarly, the security operator also affirmatively effects changes to the current baseline 20, via manipulation and aggregation of the capture windows applied to the data access attempts 22. Therefore, the inference engine 12 automatically gathers additional baseline windows and infers rules for suggestion, however the security operator affirms suggested rules and baseline changes for effecting entry into the current baseline 20. Alternate configurations and extensions may employ a knowledge base or other inferential engine for computing and applying rule suggestions according to an automated mechanism.

As indicated above, additional the inference engine 12 learns new security policy rules from allowable behavior expressed in the data access transactions 22. A check is performed, at step 201, to determine if the inference engine 12 has learned new rules which the security operator wishes to integrate with the current access policy 28. If so, the security filter enters a learn mode and control passes to step 230, in FIG. 7, as depicted at step 202 and discussed further below.

Otherwise, the method for behavior based access tracking of an application includes intercepting the access attempt to the target DB system (i.e. protected resource), as shown at step 203. The selective access includes computing, based on iteratively applying the access rules (29, FIG. 10 below) to the access attempt 22, an access result indicative of whether to allow the access attempt 22, as shown at step 204. The security filter 26 applies each rule 29 from the access policy 28 to the intercepted data access attempt, and a check is performed, at step 205, to see if the rule 29 is triggered. If the rule 29 does not apply, then the security filter iteratively applies the next rule in the access policy 28, as shown at step 206.

If the access policy 28 rule applies, then another check is performed to determine if the rule allows, disallows, or is a behavior (baseline) check, at disclosed at step 207. If the rule allows the data access transaction 22, at step 208, the enforcer 30 transmits the transaction 22 to the target DB system, as depicted at step 208. If the rule rejects the attempt, then the enforcer 30 discards and prevents the data access transaction, as shown at step 209. If the rule specifies a behavior check, then the baseline comparator 18 comparing the access attempt to the preexisting set of allowable access attempts (current baseline 20) to determine if the access attempt corresponds to a previous allowable access attempt, as depicted at step 210.

As will be discussed further below with respect to FIG. 10, the access policy 28 typically includes the behavior check of the current baseline 20 as the last in the iteratively applied set of rules. Since the access policy 28 include rules for specific circumstances of allowance or disallowance of data access attempts 22, the access policy 28 is operable to narrowly target specific instances of allowable or disallowable data access attempts 28. Therefore, a security operator may specify the specific known types of access directly rather than waiting for such access to appear in the baseline 20. Further, the learner 52 codifies such access rules based on commonalities observable from the current baseline 20, as will be discussed further below with respect to FIG. 10. However, alternate configurations may implement the baseline rule prior to the last rule entry or may make provisions for multiple baselines.

As the baseline comparator 18 evaluates the data access attempt 22, it determines the preexisting set establishing a baseline of allowable activity, contained as the current baseline 20 from the baseline repository 42, in which the baseline is indicative of an accepted set of allowable access attempts 22, as depicted at step 211. At various times in the operation of the security filter 26, the security operator may elect to modify or augment the current baseline 20 to integrate additional or new windows of captured data access attempts 22. Accordingly, the security filter 26 performs a check, as shown at step 212, to establish or modify the current baseline 20. Note that the baseline modifications, in the exemplary configuration, are effected by the security operator. Windows of captured data access attempts 22 are operable for manipulation and integration into the current baseline 20. If the security operator desires to augment the current baseline, control resumes at step 250, in FIG. 8, as shown at step 213. It should be noted that an initial current baseline 20 is captured and stored prior to receiving data access attempts 22 by the security filter 26.

Following step 212, a current baseline 20 has been established or recently modified, and the baseline comparator 18 compares the access attempt 22 to preexisting access attempts by determining a structure of the access attempt corresponding to syntactical arrangement of the SQL access attempt, as depicted at step 214. Comparison of the structure of the access attempt 22 avoids capturing and storing the actual data, which may include sensitive values, and also facilitates comparison, as will now be described in further detail.

Determining the structure of the access attempt 22 further includes parsing the access attempt 22 and building a parse tree 38 representation from the parsing, in which the parse tree 38 is indicative of a syntactical structure of the data access attempt 22, as disclosed at step 215. In the exemplary configuration, the SQL query syntax employed by the data access attempt 22 embodies a parseable syntactical structure expressible in a binary or other tree as a parse tree 38. The parse tree 38 illustrates the structure of the query, typically tracking Boolean operators of the query to illustrate conjunctive and disjunctive terms in the query. As will be apparent to those of skill in the art, a visual graphical representation of such a parse tree illustrates syntactical based differences between queries. The parse tree 38 is discussed in further detail in the copending application cited above. The baseline 20 values to which the data access attempt is compared also includes structure of the data access attempts 22 from which the baseline 20 was derived, yet avoids including data values of the data access transactions from the data access attempts from which it was derived, as depicted at step 216.

The structure obtained from the parse tree 38 lends itself to traversal of the parse tree 38 and computing distinctive value based on the tree structure. Accordingly, the hash engine 36 computes a hash value 40 of the data access attempt 22, and compares the hash value to the hash values of the previous access attempts, as depicted at step 217. The hash value allows efficient comparison to determine similar structures, and accordingly, at step 218, comparing the determined structure includes comparing a hash value 40 derived from the determined structure. The hash values of both the data access transaction 22 under scrutiny and stored hash values of the current baseline 20 correspond if the behavior indicated thereby is similar. Therefore, corresponding access attempts 22 define a similar pattern of access structures, in which the access structures are determined by tables and fields affected by the access attempt, as specified in the SQL query syntax, disclosed at step 219. Such a comparison examines the determined structure of the access attempt 22 independently of the data values implicated in the access attempt, thereby keeping the data values of the underlying transactions undisclosed.

A check is performed, at step 220, to determine if the hash values 40 match, and if not, then the enforcer 30 disallows the data access attempt 22, as depicted at step 221. Otherwise, if the hash values 40 match, then the enforcer 30 selectively permits access to the target DB 16 according to the allowable access attempt 24 as a result of the comparing.

Figure 7:
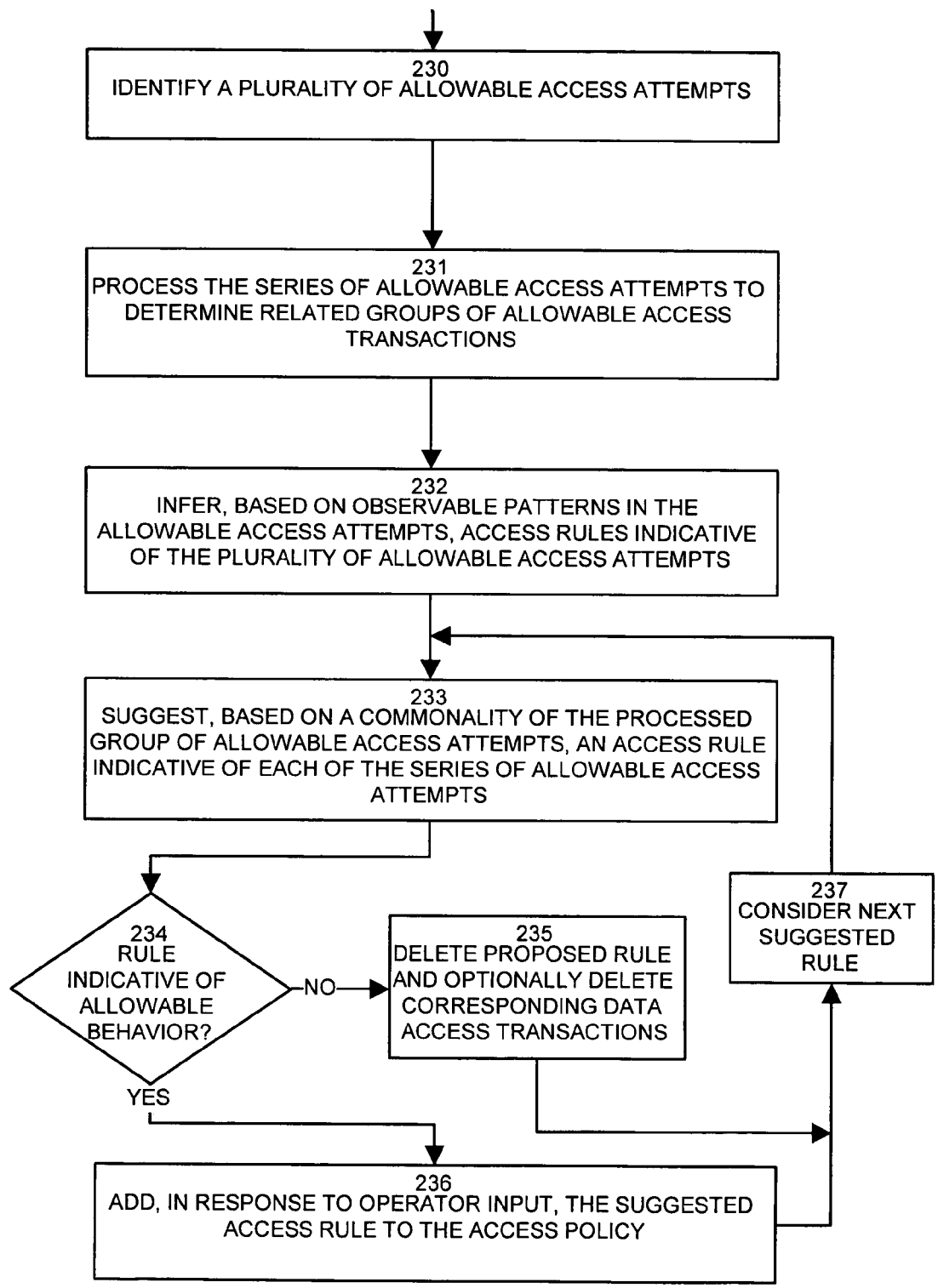
FIG. 7 is a flowchart of the rule learning and suggestion.

FIG. 7 is a flowchart of the rule learning and suggestion employed from step 202 in FIG. 4. The rule learning and suggestion operations are exemplified as establishing and/or modifying an access policy 28. The access policy 28 includes a plurality of rules 29 of which the current baseline 20 is a rule thereof. The order of the operations identifying new rules need not occur in a particular order with respect to data access attempts, and is discussed herein at an exemplary point of processing in the system of the present invention.

Referring to FIGS. 3 and 7, at step 202, a security operator elects to learn new rules using the stored data access attempts 22 in the baseline repository 42. In alternate configurations, the learning operation may be automated and/or driven by a knowledge base or other programmed logic.

The rule logic 46 identifies a plurality of allowable access attempts 22 from the repository 42 from which to infer rule suggestions, as depicted at step 230. The identified access attempts may be gathered from a sampling interval of normal system operation, during which the routine access attempts 22 are deemed to represent behavior indicative of allowable database access attempts. As indicated above, selection of the gathering, or capturing interval should not span periods likely to encounter atypical usage patterns indicative of deviant behavior. Similarly, periodic operations which are to be deemed normal behavior should be included in the window, or the access attempts concatenated from several windows collectively spanning a broad range of normal DB access which are representative of allowable behavior.

Inferring the rule suggestions includes a learner 52 (FIG. 10, below) that processes the series of allowable access attempts 24 to determine related groups of allowable access attempts 24, as depicted at step 231. The learner 52 then infers, based on observable patterns in the allowable access attempts 24, access rules indicative of the plurality of allowable access attempts, as disclosed at step 232. Therefore, the learner 52 groups the data access attempts according to a common denominator, such as tables accessed, source of the access attempts 22, type of operation performed, and timing of the operations, to name several. Other determinations of common denominators may be employed in alternate configurations.

The inference engine 12 is used by the GUI provided by the rule suggestor 44 to display a screen 58 for presentation to the security operator. The learner 52 determines rule suggestions targeting the inferred common denominators for suggesting, based on a commonality of the processed group of allowable access attempts 24, an access rule 56 indicative of each of the series of allowable access attempts, as depicted at step 233. The rule suggestor 44 displays the suggested rules for operator review. The security operator observes each of the suggested (proposed) rules (56-1 ... 56-N), and intuitively determines if the suggested rule 56-N corresponds to allowable behavior. If the rule 56-N does not correspond to expected or allowable behavior, as depicted at step 234, then the rule 56-N is discarded from the set of proposed rules 56. Additionally, the underlying data access transactions 22 contributing to the learned rule 56-N may be deleted from the baseline repository 42 as not indicative of allowable behavior.

If the rule is consistent, or deterministic, of acceptable behavior, then the inference engine 12 adds, in response to operator input, the suggested access rule 60 to the access policy 28, as depicted at step 236. The operator or other analysis mechanism then considers successive rules, as shown at step 237, until the suggested rules are considered.

Figure 8:
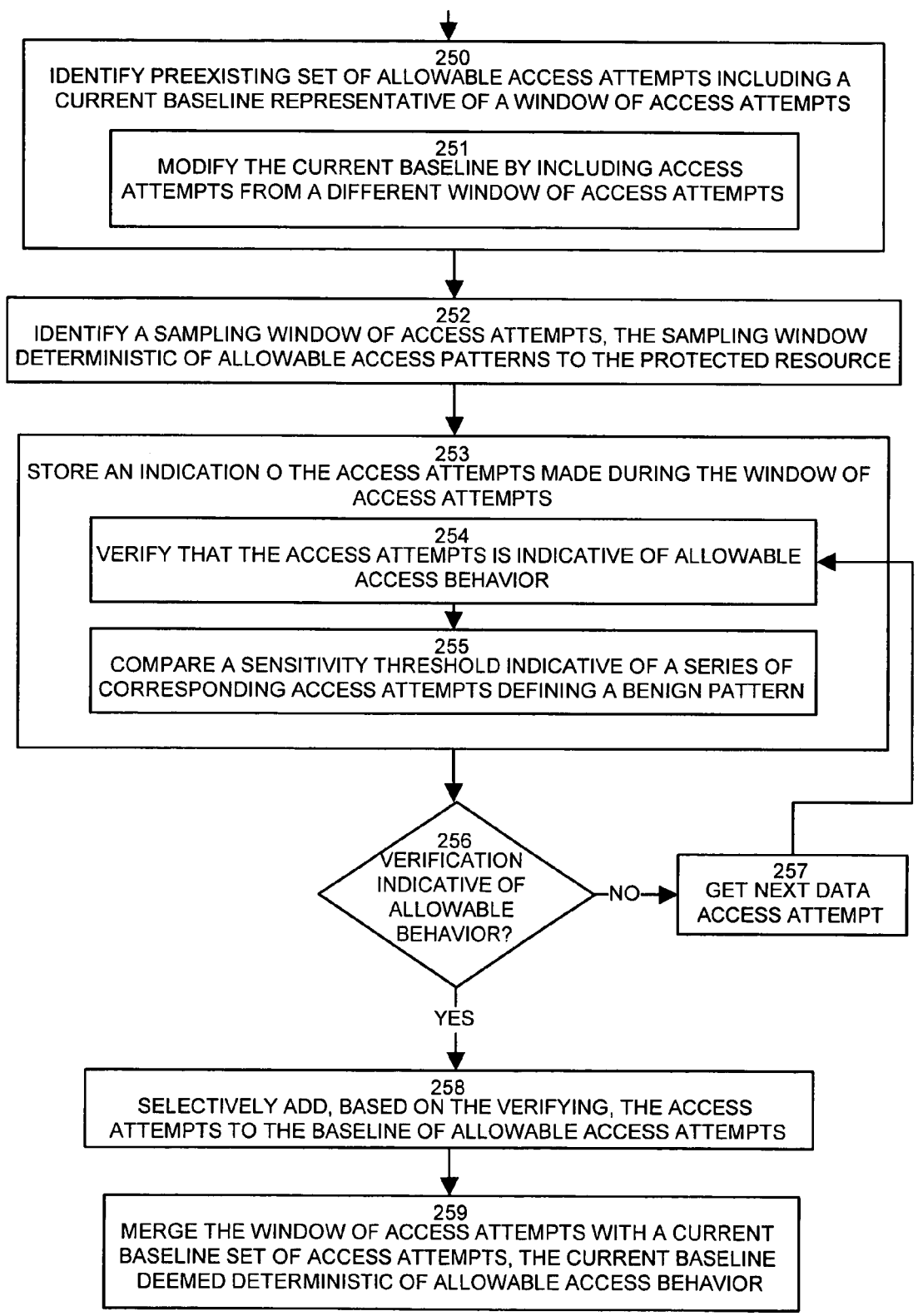
FIG. 8 is a flowchart of baseline capture and verification.

FIG. 8 is a flowchart of baseline capture and verification. Referring to FIGS. 3, 5 and 8, at step 213 the security operator or other control entity elects to establish or modify the baseline. The current baseline 20 is taken from one or more windows of database access activity deemed to be indicative of normal behavior. As discussed above, the current baseline may undergo modifications and augmentation to eliminate deviant entries and to supplement the baseline to recognize new patterns of allowable "good" behavior. Accordingly, the preexisting set of allowable access attempts deemed indicative of good behavior are the current baseline 20 representative of a window of access attempts, as disclosed at step 250. At step 251, the security operator elects to modify the current baseline by including access attempts from a different window of access attempts.

Adding additional data access attempts 22 into the current baseline 20 includes identifying a sampling window of access attempts 22, the sampling window deterministic of allowable access patterns to the protected resource, as depicted at step 255. The sampling window is deterministic of normal or anticipated database access activity which the baseline should deem as allowable.

The baseline repository 42 stores an indication of the access attempts 22 made during the identified window of access attempts, as shown at step 253. In the exemplary configuration, the DB access analyzer 32 stores the DB access attempts 52 as the corresponding hash value 40, for efficiency in comparison and storage space. However, the full SQL query form and/or the parse tree 22 representation may also be stored. Prior to storing the DB access attempt 22 as deterministic of allowable behavior, the DB access analyzer verifies that the access attempt 22 is indicative of allowable access behavior, as shown at step 254, to avoid tainted entries inconsistent with acceptable behavior. In the exemplary configuration, verification includes comparing a sensitivity threshold indicative of a series of corresponding access attempts defining a benign pattern, as depicted at step 255. A matching or similar access attempt 22 recurs a number of times according to the sensitivity threshold (50, FIG. 10, below) prior to being accepted as allowable behavior. Such a practice avoids anomalous or "one time" occurrences from attaining the status of deterministic of allowable behavior. The sensitivity threshold 50 may be modified according to performance requirements and tolerance tradeoffs between denied access and liberal scrutiny.

A check is performed, at step 256, based on the outcome of the verification, and unverifiable access attempts discarded. Control then resumes at step 257 for the next data access transaction 22. The rule suggestor 44 selectively adds, based on the verifying, the access attempts to the baseline of allowable access attempts, as depicted at step 258, and returns for successive data access attempts at step 257.

Upon completion of the data access transactions 22 in the newly gathered window, and merges the window of access attempts 22 with the current baseline 20 set of access attempts, in which the current baseline is deemed deterministic of allowable access behavior, as depicted at step 255.

Figure 9:
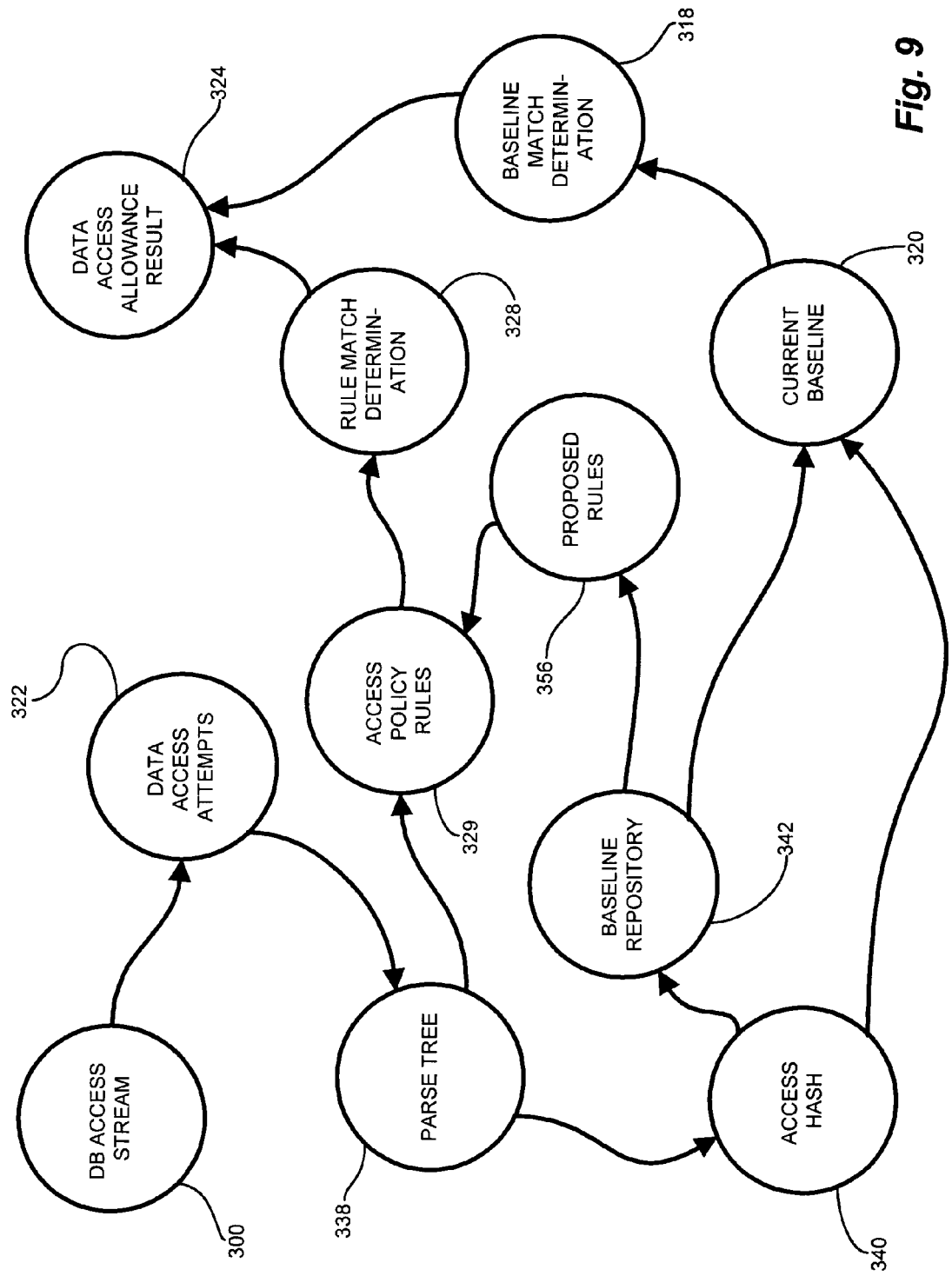
FIG. 9 is a data flow diagram according to the system of the invention of FIG. 3 as employed in the flowchart of FIGS. 4-7.

FIG. 9 is a data flow diagram according to the system of the invention of FIG. 3 as employed in the flowchart of FIGS. 4-7. Referring to FIGS. 8 and 3, a database access stream 300 emanates from a user 14 as a set of database access attempts 322. The parser 34 computes a parse tree 338 from the database access attempts 322, and the hash engine 36 computes an access hash 340 therefrom.

For rule matching throughput according to the current access policy 28, the parse tree 338 is compared to the access policy rules 329, to compute a rule match determination 328 indicative of allowable behavior (i.e. access). A positive match results an a access allowance result 324.

The access hash 340 is also written to the baseline repository 342, where it may become part of the current baseline 320. The baseline repository also contributes to proposed rules 356, after processing by the rule logic 46, resulting in new access policy rule 329. When a data access attempt 22 triggers a baseline match attempt from the access policy 28 rule 29, the baseline match determination 318 indicates in there is an access allowance result 324.

Figure 10:
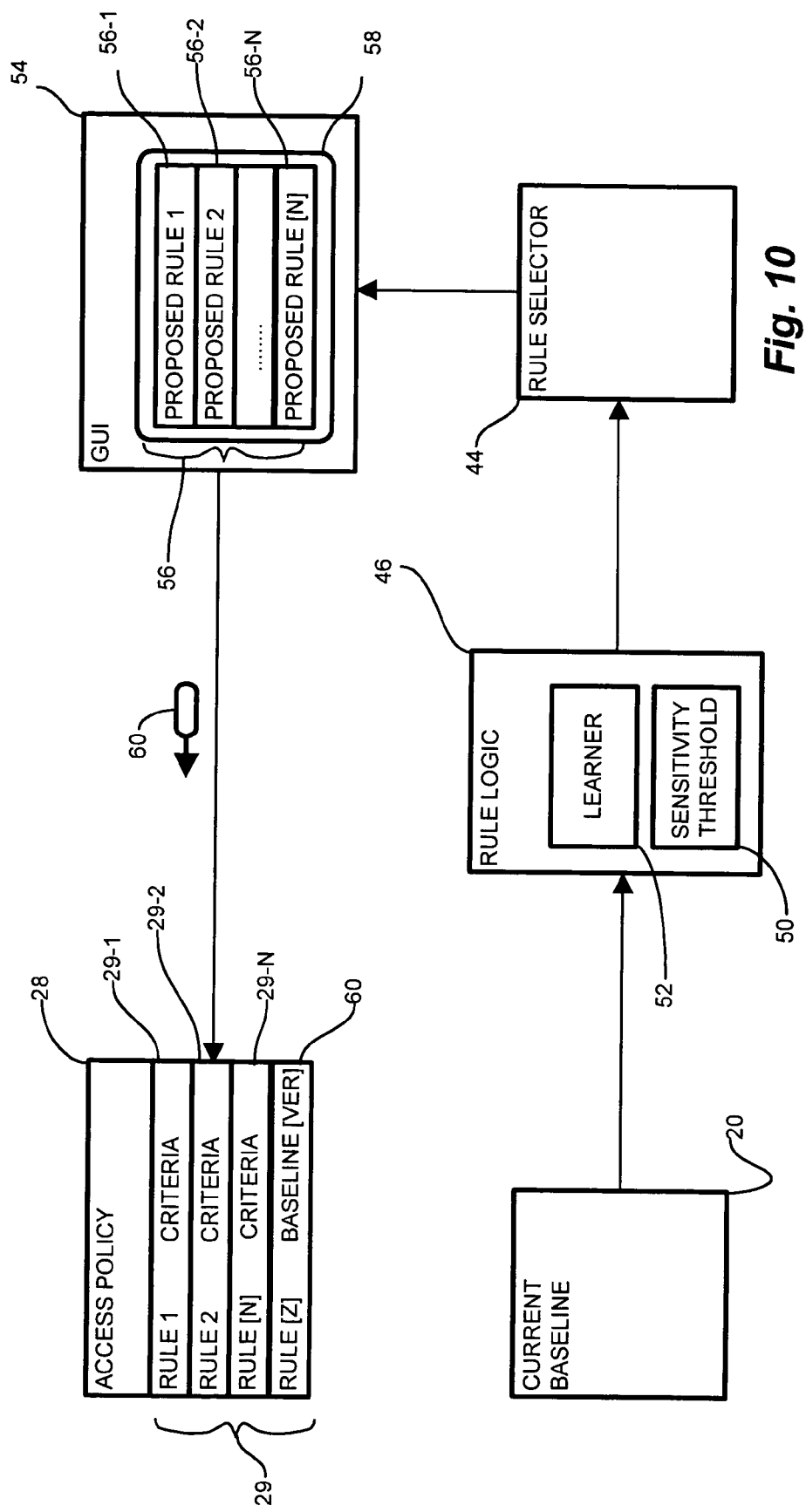
FIG. 10 is an example of suggested rule inference and intuitive selection.

FIG. 10 is an example of suggested rule inference and intuitive selection. Referring to FIGS. 9 and 3, in the exemplary configuration discussed above, the access policy 28 includes a set of rules 29, including rules 29-1 ... 29-N and a rule 60 corresponding to the current baseline 20. The current baseline 20 rule 60 tells the security filter to match the hash 40 of the current data access attempt 22 against the hash values 40 of the current baseline 20, and allow the data access attempt 24 if the comparator 18 finds a match.

The rule logic 46 learns suggested new rules 56-N by analyzing the previous access attempts 22 in the current baseline 20, derived from the baseline repository 42. Alternate configurations may draw from all data access attempts 22 in the baseline repository 42. In this manner, the rule logic 46 attempts to synthesize a set of access attempts 22 and compute a common denominator expressible as a rule 29, such as the DHCP subnet example above. Therefore, efficiency is promoted when the rule logic 46 may "boil down" numerous access attempts to a single rule 29 for entry in the access policy 28.

In further detail, the rule logic 46 employs a sensitivity threshold 50 and a learner 52. The sensitivity threshold 50, as indicated above, is a number of iterations of which a similar access transaction 22 appears to be considered normal behavior. Increasing this number decreases storage volume for the baseline repository, however may also run the risk of not classifying a relatively rare access attempt 22 as acceptable behavior. Once the access attempt 22 is considered acceptable as part of the current baseline 20, the learner 52 periodically processes the baseline 20 to compute suggested rules common to a set of allowable data access attempts 24.

The rule suggestor 44 presents the computed suggested rules 56 to the user 14 via the GUI 54, in which a screen display 58 of each of the proposed suggested rules 56-1 . . . 56-N is presented for consideration by the user 14. The user considers and may intuitively select the proposed rules 56 which seem consistent with acceptable behavior, such as in the DHCP example, and elect to enter one or more of the proposed rules 56-N as new rules 60 into the set of rules 29 of the access policy 28.

In alternate configurations, the learning mode employs a function to playback a set of given requests, and test whether or not they fall within a given baseline. The playback function replays requests within a certain period of time (with additional filters for example to replay requests from a specific IP, etc.). Such a playback operation allows the security operator to apply "what if" scenarios to suggested rules, complemented by the ability of the repository to store a window including the entire data access transaction, in addition to the hash and structure components.

Such playback and retrial ("what if") implementation of baseline-divergent functionality encompasses several different approaches. Such a learn mode provides a period of time (state of the system) during which no blocking or alerting is done and new constructs are added as they appear. An alerting mode provides that no blocking is done but alerts are sent on every request outside the baseline. In other words, the alert mode provides alerts for every request that is not within the allowed constructs and does not meet any user defined policy rule, or for Error/Exception of a certain type which occur more than defined/allowed for the current baseline.

In this manner, the learning operation provides retrial of previous windows of data access attempts against alternate sets of rules to ascertain which are deemed allowable behavior. Such retroactive playback of past behavior (previous data access attempts) allows inferential refinement and review for the suggested rules generated by the rule suggestor 44.

In other configurations, the security filter is applicable in conjunction with an off-the-shelf (OTS) packaged application. Such OTS applications are typically employed or integrated in a "black box" manner, meaning that they are invoked as unmodifiable object or executable code and do not have available source code for successive modifications. The system of the present invention as discussed above is applicable because, event though the security provisions in the "black box" of the OTS application are unavailable, baselining and inferential rule suggestion are nonetheless employable by observing the data access transactions.

In a similar manner, application of the baselining and inferential rule suggestion is applicable to the output, or results, of such an OTS application. By employing the DB analyzer at the output of a security application or object, the results of that object are receivable into the inference engine 12 for observation and determination of the current baseline 20 and the access policy 28 effectively implemented by the OTS application under scrutiny. In this manner, a security operator may observe the access policy 28 currently in place and the inferred rules 29 attributable to that current "default" access policy. Such observations may tend to be illuminating with respect to areas for improving the access policy 28.

The adaptive, behavior based access control system disclosed herein may encompass a variety of alternate deployment environments. In a particular configuration, the exemplary adaptive behavior based access control application discussed herein may be the SQL Guard application, marketed commercially by Guardium corporation of Waltham, Mass., assignee of the present application.

Those skilled in the art should readily appreciate that the programs and methods for providing adaptive behavior based access tracking and control as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for providing nonintrusive database security has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for behavior based access tracking of an application comprising:
   intercepting an access attempt to a protected resource;
   comparing the access attempt to a preexisting set of allowable access attempts to determine if the access attempt corresponds to a previous allowable access, comparing the access attempt further comprising:
      determining a structure of the access attempt corresponding to a syntactical arrangement of the access attempt; and
      comparing the determined structure of the access attempt independently of the data values implicated in the access attempt;
   selectively permitting, based on the comparing, access to the protected resource according to the access attempt; and augmenting the set of allowable access attempts by selectively adding, based on inferential feedback, the access attempt to the set of allowable access attempts.

2. The method of claim 1 wherein comparing the access attempt determines correspondence by a matching of explicit rules qualifying allowable data access attempts and by a matching of a baseline having previously allowed data access attempts.

3. The method of claim 1 wherein adding further comprises selectively adding, if the data access transaction corresponds to a window of allowable database activity, the data access attempt to the set of allowable data access attempts.

4. The method of claim 1 wherein comparing the determined structure further comprises comparing a hash value derived from the determined structure.

5. The method of claim 1 further comprising defining an access policy having a plurality of access rules, the access rules indicative of allowable access, wherein the preexisting set of allowable access attempts correspond to one of the plurality of the rules.

6. The method of claim 1 wherein determining the preexisting set comprises establishing a baseline of allowable activity, the baseline indicative of an accepted set of allowable access attempts.

7. The method of claim 6 wherein the baseline is a rule in the access policy and indicates allowable access when a data access transaction matches a previous data access transaction represented in the baseline.

8. The method of claim 6 wherein the baseline includes the structure of the access attempts, and avoids including data values of the data access transactions from which it is derived.

9. The method of claim 1 wherein selectively permitting further comprises computing, based on iteratively applying the access rules to the access attempt, an access result indicative of whether to allow the access attempt.

10. The method of claim 9 wherein adding further comprises:
identifying a sampling window of access attempts, the sampling window deterministic of allowable access patterns to the protected resource;
storing an indication of the access attempts made during the window of access attempts; and
merging the window of access attempts with the current baseline set of access attempts, the current baseline deemed deterministic of allowable access behavior.

11. The method of claim 1 further comprising:
identifying a plurality of allowable access attempts;
inferring, based on observable patterns in the allowable access attempts, access rules indicative of the plurality of allowable access attempts; and
adding the inferred rules to the access policy.

12. The method of claim 11 wherein inferring further comprises:
processing the series of allowable access attempts to determine related groups of allowable access transactions;
suggesting, based on a commonality of the processed group of allowable access attempts, an access rule indicative of each of the series of allowable access attempts; and
adding, in response to operator input, the suggested access rule to the access policy.

13. The method of claim 1 wherein the preexisting set of allowable access attempts comprise a current baseline representative of a window of access attempts, further comprising modifying the current baseline by including access attempts from a different window of access attempts.

14. The method of claim 1 wherein storing further comprises:
verifying that the access attempt is indicative of allowable access behavior; and
selectively adding, based on the verifying, the access attempts to the baseline of allowable access attempts.

15. The method of claim 14 wherein determining the preexisting set includes comparing a sensitivity threshold indicative of a series of corresponding access attempts defining a benign pattern.

16. The method of claim 15 wherein the corresponding access attempts define a similar pattern of access structures, the access structures determined by tables and fields affected by the access attempt.

17. The method of claim 1 wherein the parse tree further conforms to a platform independent format, wherein parse trees and corresponding hash values generated from different platforms are similar and are operative to result in a consistent comparison result for similar data access attempts on a plurality of platforms.

18. The method of claim 1 further comprising:
storing a set of data access attempts according to a learning window of observable database behavior;
generating suggested rules;
adding suggested rules to the security policy; and
reanalyzing the set of data access attempts gathered during the leaning window in an iterative manner against suggested rules.

19. A security filter device for behavior based access tracking of a software application comprising:
a database access analyzer operable to intercept an access attempt to a protected resource;
a baseline comparator operable to compare the access attempt to a preexisting set of allowable access attempts to determine if the access attempt corresponds to a previous allowable access attempt, the comparator for comparing the access attempts by:
determining a structure of the access attempt corresponding to syntactical arrangement of the access attempt; and
comparing the determined structure of the access attempt independently of the data values implicated in the access attempt, determining the structure further comprising:
parsing the access attempt; and
building a parse tree from the parsing, the parse tree indicative of a syntactical structure of the data access attempt, wherein comparing further comprises computing a hash value from the parse tree, and comparing the hash value to the hash values of previous access attempts;
an enforcer operable to selectively permit, based on the comparing, access to the protected resource according to the access attempt; and
an inference engine operable to add, if the access attempt is permitted, the access attempt to the set of allowable access attempts.

20. The security filter device of claim 19 wherein the baseline comparator is further operable to comparing the access attempt and determine correspondence by matching explicit rules qualifying allowable data access attempts and matching of a baseline having previously allowed data access attempts.

21. The security filter device of claim 19 further comprising:
a parser in the database access analyzer operable to determine a structure of the access attempt corresponding to syntactical arrangement of the access attempt, wherein the baseline comparator is operable to compare the determined structure of the access attempt independently of the data values implicated in the data access attempt.

22. The security filter device of claim 21 wherein the database access analyzer further includes a hash engine operable to compute a hash value derived from the determined structure.

23. The security filter device of claim 21 wherein the parser is further operable to:
   parse the access attempt; and
   build a parse tree from the parsing, the parse tree indicative of a syntactical structure of the data access attempt, wherein the baseline comparator is operable to compare the computed hash value from the parse tree to the hash values computed from previous access attempts.

24. The security filter device of claim 19 further comprising an access policy having a plurality of access rules, the access rules indicative of allowable access, wherein the preexisting set of allowable access attempts correspond to one of the plurality of the rules.

25. The security filter device of claim 19 wherein the preexisting set further comprises a baseline of allowable activity, the baseline indicative of an accepted set of allowable access attempts.

26. The security filter device of claim 25 wherein the parser is operable to generate a parse tree corresponding to the structure of the access attempts, the parse tree not including data values of the data access transactions from which it is derived.

27. The security filter device of claim 19 wherein the inference engine is operable to:
   identify a plurality of allowable access attempts; and
   infer, based on observable patterns in the allowable access attempts, access rules indicative of the plurality of allowable access attempts; and
   add the inferred rules to the access policy.

28. The security filter device of claim 27 wherein the inference engine further comprises:
   a learner operable to process the series of allowable access attempts to determine related groups of allowable access transactions, the learner further operable to suggest, based on a commonality of the processed group of allowable access attempts, an access rule indicative of each of the series of allowable access attempts; and
   a rule suggestor operable to add, in response to operator input, the suggested access rule to the access policy.

29. The security filter device of claim 19 wherein the preexisting set of allowable access attempts comprise a current baseline set representative of a window of access attempts, wherein the inference engine is operable to modify the current baseline by including access attempts from a different window of access attempts.

30. The security filter device of claim 29 wherein the inference engine is further operable to:
   identify a sampling window of access attempts, the sampling window deterministic of allowable access patterns to the protected resource;
   store an indication of the access attempts made during the window of access attempts; and
   merge the window of access attempts with the current baseline set of access attempts, the current baseline deemed deterministic of allowable access behavior.

31. The security filter device of claim 19 wherein the inference engine is further operable to:
   retain the data access attempts during a learning window of observable database behavior;
   generate suggested rules based on the learning window;
   conditionally add suggested rules to the security policy; and
   reanalyze the set of data access attempts gathered during the leaning window in an iterative manner against suggested rules.

32. The security filter device of claim 19 wherein the rule logic in the inference engine is further operable to:
   verify that the access attempt is indicative of allowable access behavior; and
   selectively add, based on the verification, the access attempts to the baseline of allowable access attempts.

33. The security filter device of claim 32 wherein determining the preexisting set includes comparing a sensitivity threshold indicative of a series of corresponding access attempts defining a benign pattern.

34. The security filter device of claim 33 wherein the corresponding access attempts define a similar pattern of access structures, the access structures determined by tables and fields affected by the access attempt.

35. The security filter device of claim 19 further including an interface operable with an external application, the interface operable to transmit allowable data access attempts to the external application.

36. The security filter device of claim 19 wherein the database analyzer further includes an interface operable with an external application, the database analyzer operable for receiving data access attempts from the external application via the interface, process the received data access attempts, and forwarding the processed data access attempts to the security filter and the repository for processing via the inference engine.

37. A computer program product having a computer readable storage medium operable to store computer program logic embodied in computer program code encoded thereon that, when executed by a computer, cause the computer to perform steps for behavior based access tracking of a software application comprising:
   intercepting an access attempt to a protected resource;
   comparing the access attempt to a preexisting set of allowable access attempts to determine if the access attempt corresponds to a previous allowable access attempt, comparing the access attempt further comprising:
      determining a structure of the access attempt corresponding to syntactical arrangement of the access attempt; and
      comparing the determined structure of the access attempt independently of the data values implicated in the access attempt, determining the structure further comprising:
      parsing the access attempt; and
      building a parse tree from the parsing, the parse tree indicative of a syntactical structure of the data access attempt, wherein comparing further comprises computing a hash value from the parse tree, and
      comparing the hash value to the hash values of previous access attempts;
   selectively permitting, based on the comparing, access to the protected resource according to the access attempt; and
   adding, if the access attempt is permitted, the access attempt to the set of allowable access attempts.

38. A security filter device for behavior based access tracking of a software application comprising:
   means for intercepting an access attempt to a protected resource;

means for comparing the access attempt to a preexisting set of allowable access attempts to determine if the access attempt corresponds to a previous allowable access attempt, means for comparing the access attempt further comprising:
  means for determining a structure of the access attempt corresponding to syntactical arrangement of the access attempt; and
  means for comparing the determined structure of the access attempt independently of the data values implicated in the access attempt, determining the structure further comprising:
  means for parsing the access attempt; and
  means for building a parse tree from the parsing, the parse tree indicative of a syntactical structure of the data access attempt, wherein comparing further comprises computing a hash value from the parse tree, and comparing the hash value to the hash values of previous access attempts;
  means for selectively permitting, based on the comparing, access to the protected resource according to the access attempt; and
  means for adding, if the access attempt is permitted, the access attempt to the set of allowable access attempts.

39. A method for behavior based access tracking of an information repository comprising:
  capturing a sequence of access attempts;
  establishing a baseline of allowable access attempts from captured access attempts and a set of preexisting allowable accesses indicative of rules defining allowable behavior;
  intercepting an access attempt to the information repository;
  parsing the access attempt to determine a syntactical arrangement of the access attempt;
  building a parse tree to determine a structure of the access attempt by, the parse tree indicative of the syntactical arrangement of the access attempt;
  computing a hash value from the parse tree, the parse tree deterministic of a query structure of the access attempt such that similar access attempts share the query structure;
  comparing the computed hash value of the access attempt to hash values computed from the established baseline to determine if the access attempt corresponds to a previous allowable access;
  selectively permitting, based on the comparing, access to the information repository according to the access attempt; and
  augmenting the established baseline by selectively adding, based on inferential feedback, the access attempt to the set of allowable access attempts for invocation with successive access attempts.

40. The method of claim 39 further comprising comparing the determined structure of the access attempt independently of the data values implicated in the access attempt, such that the computed hash is unaffected by differences in queried data values.

41. The method of claim 39 wherein augmenting further comprises:
  identifying a sampling window of access attempts, the sampling window deterministic of allowable access patterns to the protected resource;
  storing an indication of the access attempts made during the window of access attempts; and
  merging the window of access attempts with the current baseline set of access attempts, the current baseline deemed deterministic of allowable access behavior.

* * * * *

UNITED STATES PATENT AND TRADEMARK OFFICE
CERTIFICATE OF CORRECTION

PATENT NO. : 7,506,371 B1
APPLICATION NO. : 10/762660
DATED : March 17, 2009
INVENTOR(S) : Ben-Natan Page 1 of 1

It is certified that error appears in the above-identified patent and that said Letters Patent is hereby corrected as shown below:

Claim 18, Column 18, Line 27, "during the leaning" should read "during the learning".
Claim 31, Column 20, Line 5, "the leaning window" should read "the learning window".

Signed and Sealed this

Twenty-first Day of April, 2009

JOHN DOLL
*Acting Director of the United States Patent and Trademark Office*